United States Patent
Park et al.

(10) Patent No.: US 9,949,208 B2
(45) Date of Patent: Apr. 17, 2018

(54) METHOD AND APPARATUS FOR SELECTING POWER PREFERENCE INFORMATION IN A WIRELESS COMMUNICATION SYSTEM NETWORK

(71) Applicants: Samsung Electronics Co., Ltd., Suwon-si (KR); Korea University Research and Business Foundation, Seoul (KR)

(72) Inventors: Yongseok Park, Seoul (KR); Hwangnam Kim, Seoul (KR); Chulho Lee, Suwon-si (KR); Min Kim, Seoul (KR); Hyunsoon Kim, Seongnam-si (KR); Woonghee Lee, Seoul (KR); Joon Yeop Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 96 days.

(21) Appl. No.: 15/000,893

(22) Filed: Jan. 19, 2016

(65) Prior Publication Data

US 2016/0212709 A1    Jul. 21, 2016

(30) Foreign Application Priority Data

Jan. 16, 2015 (KR) ........................ 10-2015-0008018

(51) Int. Cl.
*H04W 52/02*    (2009.01)

(52) U.S. Cl.
CPC ... *H04W 52/0251* (2013.01); *H04W 52/0216* (2013.01); *Y02B 60/50* (2013.01)

(58) Field of Classification Search
CPC ........................ H04W 52/0251; H04W 52/0216
See application file for complete search history.

(56) References Cited

U.S. PATENT DOCUMENTS

| 2006/0277373 A1* | 12/2006 | Pohl ...................... G06F 9/4818 |
| | | 711/151 |
| 2008/0232310 A1 | 9/2008 | Xu |
| 2012/0124196 A1 | 5/2012 | Brisebois et al. |
| 2013/0107727 A1 | 5/2013 | Lunden et al. |

(Continued)

FOREIGN PATENT DOCUMENTS

| EP | 2720498 A1 | 4/2014 |
| WO | 2013/066053 A1 | 5/2013 |

(Continued)

OTHER PUBLICATIONS

European Search Report for EP16151660 dated May 23, 2016.
European Search Report for EP16151660 dated Aug. 7, 2017.

*Primary Examiner* — Ronald B Abelson
(74) *Attorney, Agent, or Firm* — McAndrews, Held & Malloy, Ltd.

(57) ABSTRACT

A method and apparatus is provided for selecting power preference information based on network usage information used for a background process of a terminal. The power preference information selection method of the present disclosure includes measuring background network usage of a terminal, acquiring network usage information of the terminal when the background network usage exceeds a predetermined threshold, selecting the power preference information based on the network usage information, and transmitting the power preference information to the base station.

16 Claims, 11 Drawing Sheets

(56) References Cited

U.S. PATENT DOCUMENTS

| | | | |
|---|---|---|---|
| 2014/0092733 A1* | 4/2014 | Johansson | H04W 52/0216 370/230 |
| 2014/0105010 A1 | 4/2014 | Fang | |
| 2014/0247765 A1 | 9/2014 | Baghel et al. | |
| 2014/0254451 A1 | 9/2014 | Jamadagni et al. | |
| 2016/0073284 A1* | 3/2016 | Qian | H04W 52/0229 370/241 |
| 2017/0019948 A1* | 1/2017 | Baghel | H04W 52/0203 |

FOREIGN PATENT DOCUMENTS

| | | | | |
|---|---|---|---|---|
| WO | 2013171577 A1 | | 11/2013 | |
| WO | WO2014049198 | * | 4/2014 | H04W 76/04 |
| WO | WO2014180195 | * | 11/2014 | H04W 52/0222 |

* cited by examiner (a) application usage amount [e.g. VoIP]

(b) application usage amount and background network usage amount (a) web surfing (e.g. Chrome)   (b) video playback (e.g. Daum Pot)

(a)

(b)

METHOD AND APPARATUS FOR SELECTING POWER PREFERENCE INFORMATION IN A WIRELESS COMMUNICATION SYSTEM NETWORK

RELATED APPLICATION(S)

This application claims the benefit under 35 U.S.C. § 119(a) of a Korean patent application filed on Jan. 16, 2015 in the Korean Intellectual Property Office and assigned Serial No. 10-2015-0008018, the entire disclosure of which is hereby incorporated by reference.

BACKGROUND

The present disclosure relates to a power management method and apparatus and, in particular, to a method and apparatus for selecting power preference information based on network usage information used for a background process of a terminal.

Mobile communication systems were developed for the purpose of providing mobile users with communication services. With the rapid advance of technologies, the mobile communication systems have evolved beyond the early voice-oriented services to providing high speed data communication service.

Unlike voice service, data service is provided on resources determined according to the data amount to be transmitted and channel condition. Accordingly, the wireless communication system, especially cellular communication, is provided with a scheduler that manages transmission resource allocation in consideration of the required resource amount, channel condition, data amount, etc. This is the case in the Long Term Evolution (LTE) system, the present mobile communication system, and a scheduler located at the base station manages the transmission resource allocation.

Recent studies have been conducted on LTE-Advanced (LTE-A) to increase the data rate with the adoption of various new techniques to the legacy LTE system. As a power saving technique, Discontinuous Reception (DRX) has been proposed along with various parameters such as User Inactivity Timer (UIT) value, but this has the drawback of not reflecting the condition of a terminal because the parameters can be reconfigured by the network and no direct involvement of the terminal is possible. In order to overcome this drawback, a method of using a Power Preference Indicator (PPI) has been proposed, but the PPI has been standardized only recently. Consequently, there is only a specification about a procedure of transmitting/receiving related information and none about the basis used by a terminal to transmit PPI information.

SUMMARY

The present disclosure describes a method and apparatus for selecting power preference information depending on the network usage information used by a terminal in the background process (hereinafter, referred to as background network usage information).

In accordance with an aspect of the present disclosure, a terminal for selecting power preference information is provided. The terminal includes a communication unit configured to communicate with another network entity. The terminal further includes a control unit configured to control measuring background network usage of the terminal, acquiring network usage information of the terminal when the background network usage exceeds a first predetermined threshold, selecting the power preference information based on the network usage information, and transmitting the power preference information to a base station.

In accordance with another aspect of the present disclosure, a method for selecting power preference information is provided. The method includes measuring background network usage of a terminal, acquiring network usage information of the terminal when the background network usage exceeds a predetermined threshold, selecting the power preference information based on the network usage information, and transmitting the power preference information to the base station.

DETAILED DESCRIPTION

Figure 1:
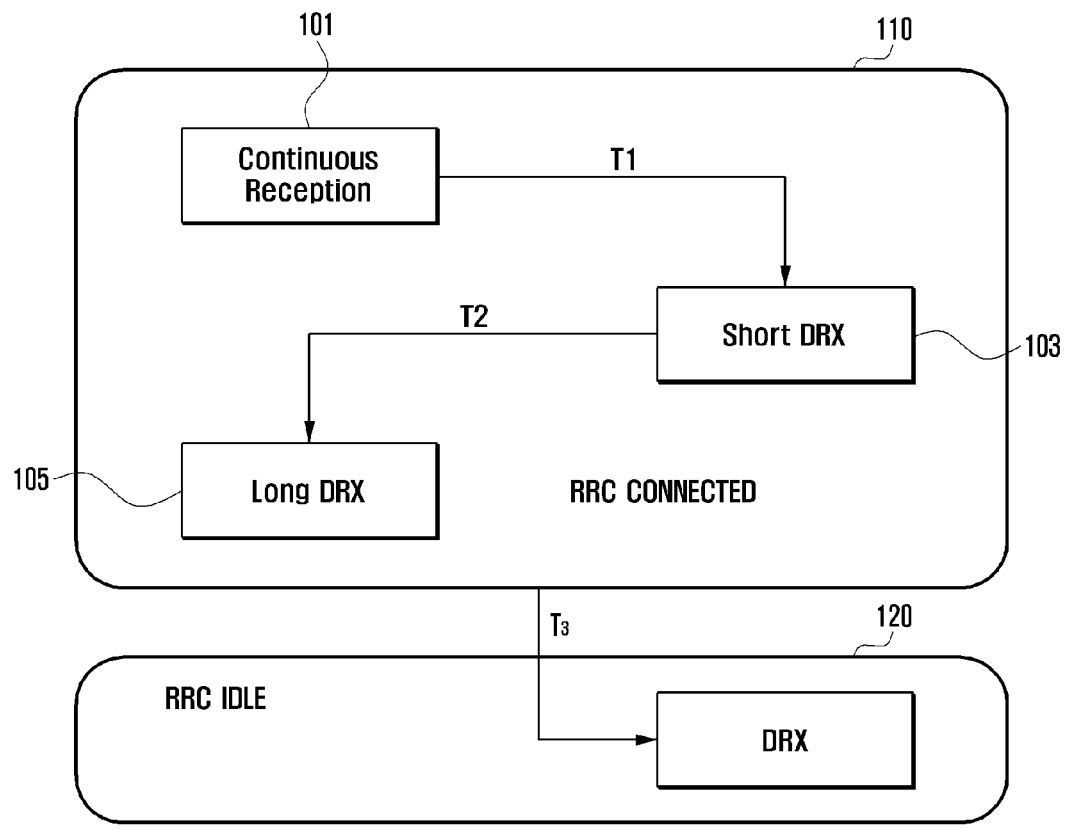
FIG. 1 is a diagram illustrating a user inactivity timer (UIT) operation and Discontinuous Reception (DRX) operation of a terminal.
Figure 1:
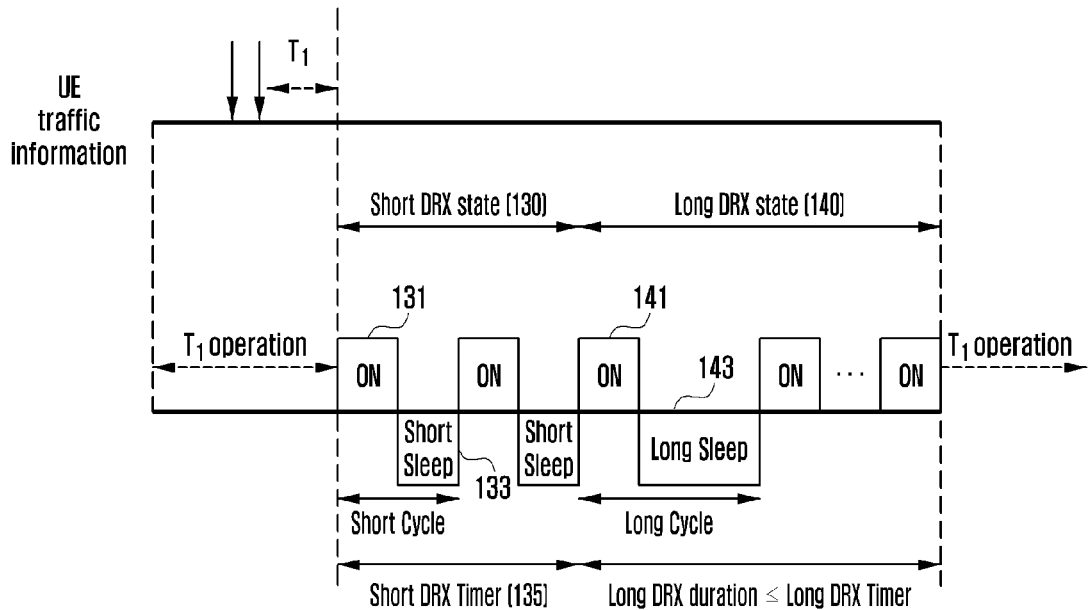

Exemplary embodiments of the present disclosure are described with reference to the accompanying drawings in detail.

Detailed descriptions of well-known functions and structures incorporated herein may be omitted to avoid obscuring the subject matter of the present disclosure. This aims to omit unnecessary description so as to make clear the subject matter of the present disclosure.

For the same reason, some of elements are exaggerated, omitted, or simplified in the drawings and the elements may, in practice, have sizes and/or shapes different from those shown in the drawings. The same reference numbers are used throughout the drawings to refer to the same or like parts.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the exemplary embodiments set forth herein. Rather, these exemplary embodiments are provided so that this disclosure will be thorough and complete and will fully convey the inventive concept to those skilled in the art. Like reference numerals refer to like elements throughout the specification.

The terms used in the following description are provided to help understand the present disclosure and may be modified to different forms without departing from the spirit of the present disclosure.

FIG. 1 is a diagram illustrating a user inactivity timer (UIT) and Discontinuous Reception (DRX) operation of a terminal.

Part (a) of FIG. 1 shows a DRX operation in a Radio Resource Control (RRC) connected mode as denoted by reference number 110 and a state transition from the RRC connected mode 110 to RRC idle mode as denoted by reference number 120. DRX is characterized by a period when transmitting/receiving data is allowed and a period when transmitting/receiving is not allowed to minimize power consumption for using the network.

In detail, the terminal transmits/receives data in a continuous reception state as denoted by reference number 101. If no transmission/reception (Tx/Rx) data is generated during a predetermined time period T1, the terminal makes a state transition to a short DRX state as denoted by reference number 103. If no Tx/Rx data is generated during a predetermined time period T2 in the short DRX state, the terminal makes a state transition to a long DRX state as denoted by reference number 105. Also, if a predetermined time period T3 elapses in the RRC connected mode, the UE makes a state transition from the RRC connected to the RRC idle mode. The time period T3 may denote a UIT value as the time of transition from the RRC connected mode to the RRC idle mode and may be set to a value greater than the sum of T1 and T2.

Part (b) of FIG. 1 shows the detailed DRX operation in the RRC connected mode. The DRX may operate differently depending on whether the terminal is in the RRC idle mode or RRC connected mode. In the RRC idle mode, the DRX opens a control channel to exchange information between the terminal and network as well as connect the terminal directly to an uplink or downlink data channel.

In the RRC connected mode, the DRX state is subdivided into a short DRX state and a long DRX state, with the short DRX state having a sleep period shorter than that of the long DRX.

In the RRC connected mode, if no data transmission/reception occurs in the continuous reception state, the terminal makes a DRX state transition to the short DRX state 130. If the short DRX state 130 is on (ON state) as denoted by reference number 131, the terminal can transmit/receive data; if the terminal is in the short sleep (OFF) state as denoted by reference number 133, the terminal cannot transmit/receive data. The time for being in the on state before transitioning to the short sleep state is stored in the DRX inactivity timer.

If no Tx/Rx data is generated during the time corresponding to the short DRX timer 135, the terminal makes a state transition to the long DRX state 140. The long DRX state 140 includes a long sleep state 143 in which data transmission/reception is not allowed and which is longer than short sleep state of the short DRX state 130. As in the short DRX state 130, the terminal can transmit/receive data when the long DRX state is on as denoted by reference number 141, but it cannot transmit/receive data in the long sleep state 143.

Accordingly, the base station can increase the power efficiency of the terminal using the DRX parameters (e.g. DRX cycle, on and off state periods, short DRX timer, long DRX timer, and DRX inactivity timer).

Figure 2:
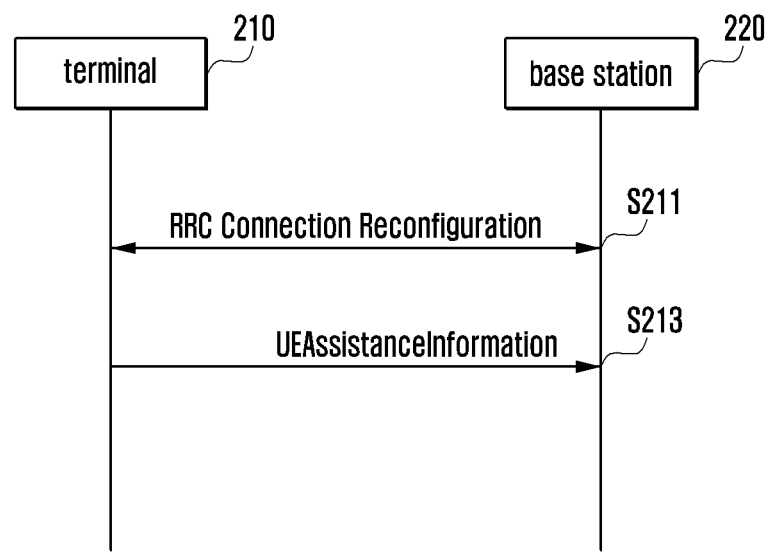
FIG. 2 is a signal flow diagram illustrating a power preference indicator (PPI) transmission procedure of a terminal according to an embodiment of the present disclosure.

FIG. 2 is a signal flow diagram illustrating a PPI transmission procedure of a terminal according to an embodiment of the present disclosure. The UIT and DRX parameters are determined by a base station without taking into account the state of a terminal. Therefore there is a need of a method for a base station to configure the parameters based on the information from the terminal.

In FIG. 2, a terminal 210 may send a base station 220 the information defined as UEAssistanceInformation at operation 213 after an RRC connection is reconfigured between the terminal 210 and the base station 220 (e.g. Evolved Universal Terrestrial Radio Access Network (E-UTRAN)) at operation S211. The information may include a 1-bit PPI. The PPI may be configured to indicate a low power mode or a normal mode.

For example, the 1-bit PPI may be set to 0 for the low power mode and 1 for the normal mode (hereinafter, it is assumed that the PPI is set to 0 for the low power mode and 1 for the normal mode). Thus, if it is necessary to increase the power efficiency, the terminal may send the base station the PPI set to 0. If the PPI is received, the base station may send the terminal a power parameter corresponding to the PPI.

For example, if the PPI set to 0 is received, the base station sends the terminal the UIT set to a small value in order for the terminal to make a state transition to the RRC idle mode quickly for saving power and the DRX inactivity timer set to a small value to reduce data transmission/reception time.

In order to select the PPI value to be transmitted to the base station, the terminal may take into account the type of the application in use. For example, if a high power-consuming application is running, the terminal may set the PPI to 0 to improve power efficiency. However, if an application with significant data transmission/reception is running, the terminal may set the PPI to 1 to improve data throughput. The criteria for selecting application-specific PPI value may be preconfigured.

However, as noted before, the PPI value selection procedure includes no mechanism for providing the base station with network usage information of the terminal. Particularly when the background network usage level is high, the application type-based PPI value determination has a drawback in that the condition of the terminal is not reflected precisely. The present disclosure proposes a method of determining the PPI value based on the background network usage information of the terminal.

Figure 3A:
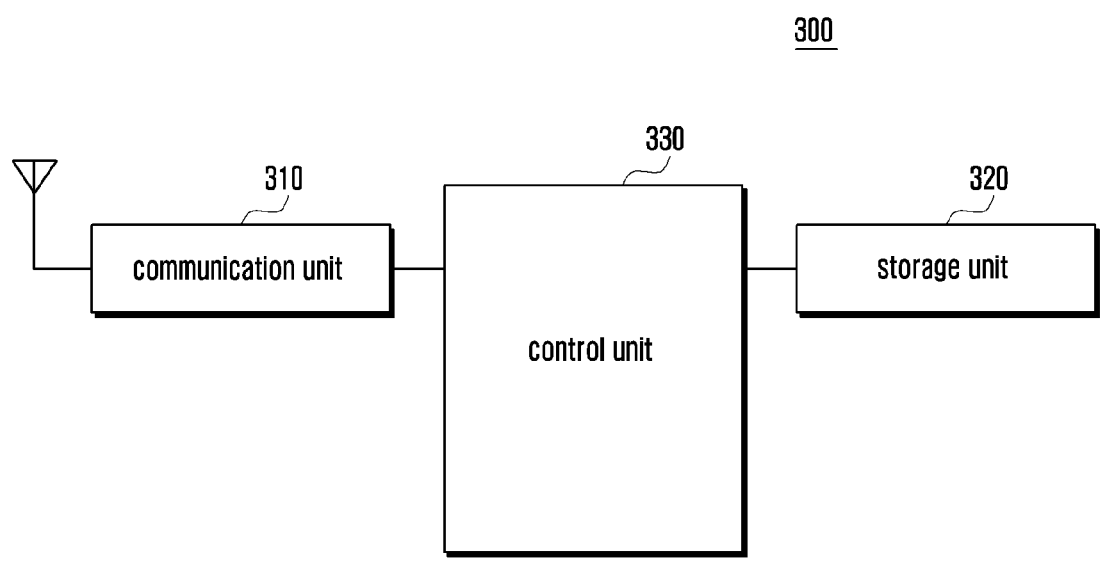
FIG. 3A is a block diagram illustrating a configuration of a terminal according to an embodiment of the present disclosure.

FIG. 3A is a block diagram illustrating a configuration of a terminal according to an embodiment of the present disclosure. As shown in FIG. 3A, the terminal 300 according to an embodiment of the present disclosure includes a communication unit 310, a storage unit 320, and a control unit 330.

The communication unit 310 is responsible for communicating data with other network entities. The communication unit 310 also may send the base station the power preference information configured by the control unit 330 and receive the power-related parameter value generated based on the power preference information from the base station.

In the present disclosure, the power preference information may include a PPI. If the power preference information is received, the base station may send the terminal a power parameter corresponding to that information.

The storage unit 320 may store the network usage information of the terminal. The network usage information may include data transmission amount per a certain unit time, data reception amount, total transmission/reception amount, and RRC state per unit time. The network usage information may also include the power preference information configured to the corresponding terminal. The network usage information may also include application usage information and background network usage information.

In detail, the application usage information denotes the information on the use of an application service with which a user interacts with a terminal. For example, if the user is watching a video downloaded from a video server by a smartphone, the information on the use of the video service may be the application usage information. The application usage information may include application usage amount. The application usage amount may denote data transmission/reception amount measured in association with the use of the application.

The background network usage information denotes the information on the use of a network by background services running in the terminal without interaction with the user. For example, the information on the system update progressing in the terminal may be the background network usage information. The background network usage information may include background network usage amount, which may denote data transmission/reception amount measured in association with the use of the background services.

The control unit 330 may include a background network usage information measurement unit 331, an application management unit 332, a network usage information extraction unit 333, a power parameter set-specific gain information and loss information computing unit 334, a power preference information configuration unit 335, and a user preference level reception unit 336.

Figure 3B:
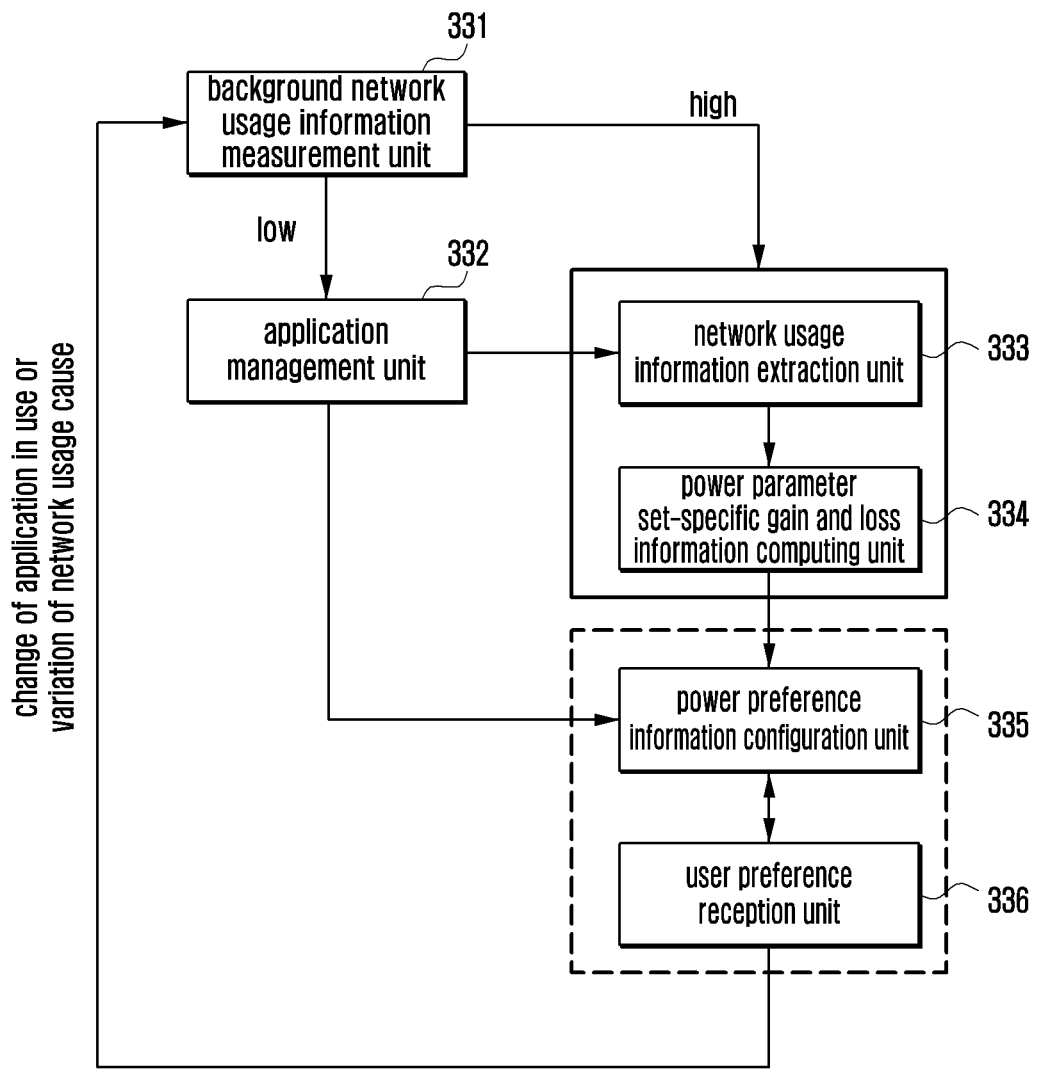
FIG. 3B is a block diagram illustrating a configuration of the control unit of FIG. 3A.

FIG. 3B is a block diagram illustrating a configuration of the control unit of FIG. 3A. The background network usage information measurement unit 331 measures the background network use associated with the background services running in the terminal. The background network usage information measurement unit 331 may also determine whether the background network usage level exceeds a predetermined threshold. The threshold may be a value preconfigured to the terminal.

If the background network usage level is greater than the threshold value, the control unit 330 may use the network usage information to determine the power preference information. Accordingly, the network usage information extraction unit 333 may collect the network usage information generated in association with the use of internet service during a predetermined period. The network usage information of the terminal may denote the application usage information or the background network usage information. The network usage information may include the information on the data amount transmitted/received per predetermined unit time and be expressed in the form of transmission, reception, and/or communication data amount.

When a power-related parameter configured differently depending on the power preference information is applied to the terminal, the power parameter set-specific gain and loss information computing unit 334 may compute gain information and loss information occurring in the terminal.

For example, the terminal may receive the UIT set to a value depending on the power preference information it has transmitted, and it is assumed that the UIT is set to one of 5 seconds and 15 seconds. If the UIT is set to 5 seconds, the terminal makes a transition to the RRC idle mode quickly to obtain gain in power savings but may have lower data throughput. The gain information may denote that the reduction of power consumption is calculated into a value, and the loss information may denote the reduction of throughput (e.g. increase of delay time) is calculated into a value. The loss information and gain information are described in detail later.

If the background network usage level is equal to or less than the threshold, the control unit 330 may operate the application management unit 332. If the background network usage level is equal to or less than the threshold value, the background network usage information does not have a large influence on determining the power preference information. Thus, the control unit 330 may configure the power preference information based on the type of the application. In this case, the application management unit 332 may check the usage of the application in use by the user and configure the power preference information based on the type of the application in use, which is included in the application usage information. The application usage information may include the type of the application in use and network usage amount associated with the use of the application.

For example, the application management unit 332 may check the application (such as music player, video streaming player, web browser, and telephony applications) in use by the user and configure the power preference information based on the type of the application in use. If multiple applications are running, the application management unit 332 may check the application usage information reflecting the use of the multiple applications.

However, when two or more applications are running, the network usage amount may sometimes exceed the threshold value. Thus, the power preference information selected based on only the type of the application may not reflect the condition of the terminal. In order to overcome this situation, if the application management unit 332 checks that the number of applications in use by the user is equal to or greater than a predetermined value, the control unit 333 may control the network usage information extraction unit 330 to check the network usage information and configure the power preference information based on the network usage information.

The power preference information configuration unit 335 may select the power preference information suitable for the terminal based on the user preference. For example, if the user preference received by the user preference reception unit 336 indicates increase of power preference, the power preference information configuration unit 335 may select the power preference information capable of providing the highest power efficiency regardless of the sensible quality. Sensible quality may be defined as quality of service, or the user being able to distinguish quality of service of their terminal with respect to, for example, execution times of applications and/or upload/download times of data. The power preference information capable of providing the highest power efficiency may have the highest power gain among the gain values calculated by the power parameter set-specific gain and loss information computing unit 334. If the user preference indicates increase of sensible quality, the power preference information configuration unit 335 may select the power preference information capable of providing the highest sensible quality.

The user preference reception unit 336 may receive the user preference information and transfer the user preference information to the power preference information configuration unit 335. The power preference information configuration unit 335 may determine the power preference information based on the preference level measured by the user preference measurement unit 336.

Figure 4:
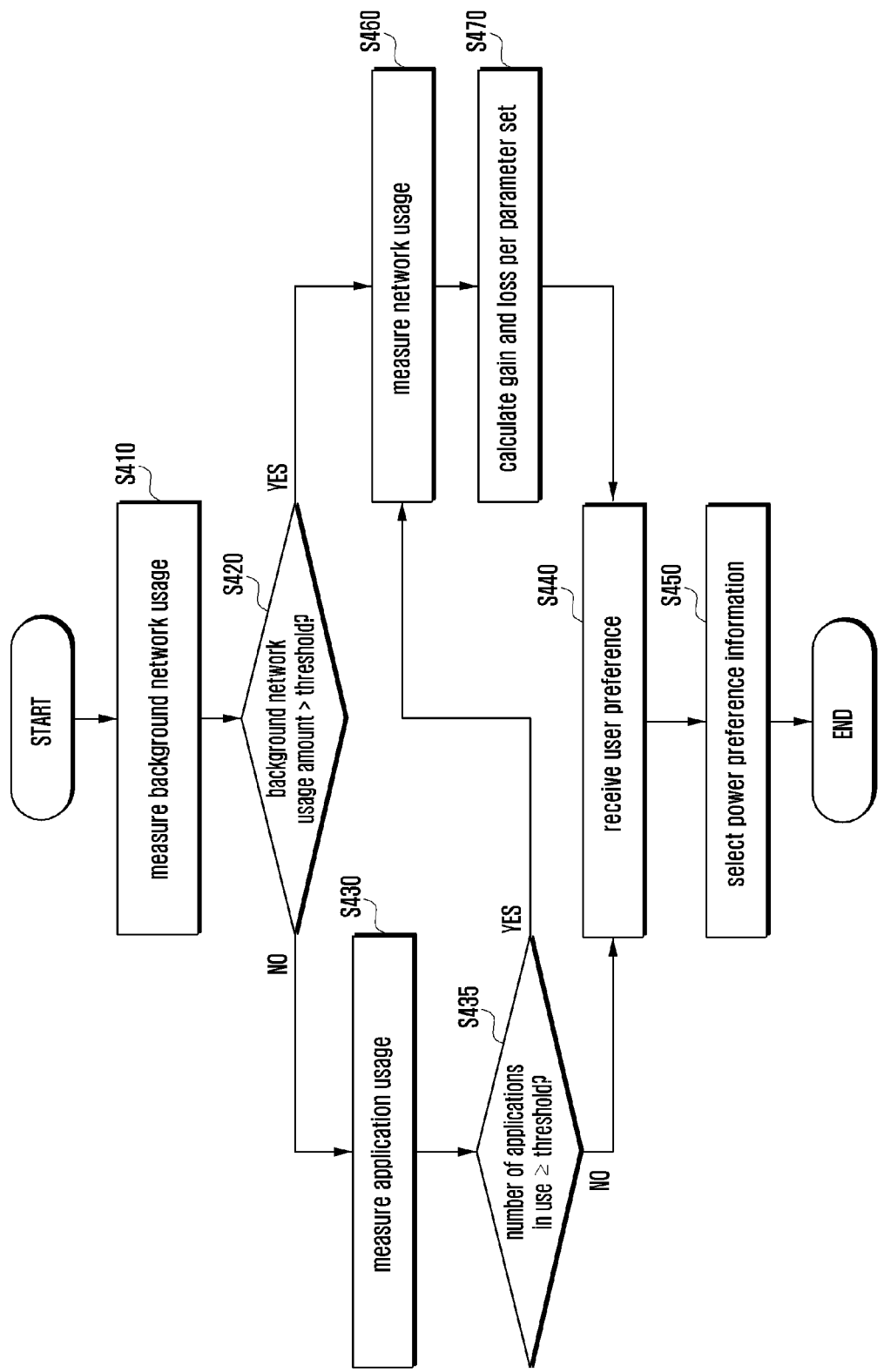
FIG. 4 is a flowchart illustrating a power preference information selection procedure of a terminal according to an embodiment of the present disclosure.

FIG. 4 is a flowchart illustrating a power preference information selection procedure of a terminal according to an embodiment of the present disclosure.

The terminal may measure background network usage of the terminal at operation S410. The background network usage information denotes information on the use of a network by background services running in the terminal without interaction with the user. For example, the background network usage information may include the information on use of system update, software download, and/or file sharing. The application usage information denotes information on the use of application services for which the user interacts with the terminal.

The background service and the application service may be used by the terminal simultaneously. For example, the user may talk to a person through Voice over Internet Protocol (VoIP) while various system updates are in progress in the terminal. In this case, the terminal should consider the background network usage information.

After measuring the background network usage, the terminal determines whether the background network usage amount is greater than a predetermined threshold at operation S420. This is a method of determining whether to use the network usage information including the background network usage information to select the power preference information.

If the background network usage amount included in the background network usage information is very high in comparison with the application usage amount included in the application usage information or if the background network usage amount is greater than the predetermined threshold, there may be a large difference between the network usage amount included in the network usage information and the application usage amount. Accordingly, selecting the power preference information based on only the type of the application may not reflect the condition of the terminal precisely. When the background network usage amount is high, it may be advantageous to select the power preference information based on the network usage information included in the background network usage information.

Otherwise, if the background network usage amount is not high, the background network usage amount does not have a large influence on the network usage amount of the terminal. Thus, it is possible to select the power preference information based on the type of the application.

The influence of the background network usage amount on the total network usage amount is described later with reference to FIG. 5.

If it is determined that the background network usage amount is equal to or less than the predetermined threshold at operation S420, the terminal measures application usage at operation S430. In case the background network usage amount is equal to or less than the predetermined threshold, the background network usage amount does not have a large influence on the network usage amount. Thus, it is possible to select the power preference information based on only the application usage information.

In detail, the application usage information may include the type of application running in the terminal and the data usage amount per application type. Accordingly, the terminal can select the power preference information based on the type of application that is included in the application usage information.

The terminal determines whether the number of the applications running in the terminal is equal to or a predetermined value (e.g. two) at operation S435. If the number of applications is equal to or greater than the predetermined value, selecting the power preference information based on only the type of the application may not reflect the condition of the terminal precisely. Accordingly, when two or more applications are running, the terminal measures network usage to select the power preference information based on the network usage information at operation S460. The network usage information-based power preference information selection procedure is described later.

If the number of applications running in the terminal is less than the predetermined value, the terminal receives the user preference information at operation S440. The user preference information may include indication of power efficiency increment or sensible quality increment.

If the user preference information is received, the terminal may select the power preference information based on the user preference information and application usage information at operation S450.

For example, if the received user preference information indicates power efficiency increment, the terminal sends the base station the PPI set to 0 as the power preference information to minimize power consumption.

If the usage amount of the application running in the terminal is small, this means that the power consumption of the terminal is small. Thus, the terminal may send the base station the power preference information including the PPI set to 1.

In this way, the terminal selects the power preference information based on the received user preference information and the type of the application, and the power preference information per application type may be pre-stored.

Returning to operation S420, if it is determined that the background network usage amount is greater than the predetermined threshold, the terminal measures its network usage at operation S460. The network usage information denotes the terminal's network usage amount collected by unit time during a predetermined time. The network usage information may include the application usage information and the background network usage information.

The network usage information may include information on how the terminal has used the network during a predetermined time period. The network usage information may also include information on the change of the RRC state of the terminal. The network usage information may be used for calculating gain information and loss information depending on the power parameter configuration.

For example, the network usage information may be expressed as $\{P, D_{total}, D_{sent}, D_{received}, S_{RRC}, param\}$. Here, P denotes a network usage information collection period of a terminal on the basis of a certain unit time. $D_{total}$, $D_{sent}$, and $D_{received}$ denote communication data amount, transmission data amount, and reception data amount respectively. $S_{RRC}$ denotes RRC state of the terminal by unit time. Also, param denotes the power preference information configured for the corresponding terminal.

After measuring the network usage at operation S460, the terminal calculates gain information and loss information per parameter set at operation S470.

In the present disclosure, the term "parameter" means the power parameter, and the term "parameter set" means a set of the parameters corresponding to certain preference information. The parameter set may include, for example, the UIT and DRX parameters as follows.

UIT: This is a timer running when there is no traffic for the terminal and if the timer expires, there is a state transition from RRC-CONNECTED to RRC_IDLE. That is, the larger the configured timer value is, the longer the terminal stays in the RRC_CONNECTED state and the higher the probability of data reception. This means that the user's data throughput increases because the data reception delay at the terminal is shortened as the UIT value increases. Meanwhile, power consumption increases in case the terminal stays longer in the RRC_CONNECTED state.

DRX cycle: There is a short DRX cycle and a long DRX cycle and, as its value increases, the OFF state increases in time. The ON state may remain the same, although this may change from implementation to implementation. Typically, the short DRX cycle is shorter than the long DRX cycle.

DRX timer: This is a timer value indicating a duration during which a DRX cycle is running, and at least one DRX cycle appears while the corresponding timer is running. If this timer expires, the old DRX period is switched with a longer version of the DRX cycle; and, if any data is received before the expiry of the timer, the timer is initialized and may be transitioned to a higher state depending on the received data amount. If any data is received before the timer expires, the timer is initialized and may be transitioned to a higher state depending on the received data amount.

DRX on idle (DRX-I): The above-described DRX parameters are all related to the DRX in the RRC connected mode, but the DRX operates even in the RRC idle mode. The power consumption is very low in the RRC idle mode in comparison with the RRC connected mode because there is only simple paging channel access. The DRX cycle is repeated infinitely without any DRX timer before state transition occurs in the DRX-I state.

onDurationTimer: This timer starts at the beginning of the DRX cycle when the terminal powers on in the connected mode and, typically, is used to check whether there is any incoming packet. The terminal monitors the downlink channel to check whether there is any data to receive. If there are no data to receive, the terminal makes a state transition to the sleep state. If there are data to receive, the terminal starts receiving in the duration of the next timer. However, in the case where data are generated sporadically such as VoIP service, it may be possible to manage the DRX operation very efficiently by extending the onDurationTimer to a maximum allowed number of subframes as far as possible and minimizing the length of the next DRX inactivity timer.

DRX inactivity timer: If there is more data to receive or any data to transmit in the buffer after the expiry of the onDurationTimer, the data may be processed in the duration of this timer. If the data are not processed in this duration, it is necessary to make a transition to the continuous reception state because otherwise the terminal enters the sleep state to reduce power consumption. If it is possible to know the data amount required for the service, the terminal may adjust the number of subframes of the corresponding timer to accommodate the required data amount.

DRX retransmission timer: If packet loss occurs because of link failure while transmitting data in the duration of the inactivity timer, it is possible to secure the time necessary for retransmitting the packets using this timer. Of course, if the link condition is good, it is possible to protect against unnecessary power consumption by reducing the timer value.

One or more power parameters, which may change according to the power preference information, may be selected by the service provider. For example, the service provider may change one or both of the UIT and DRX cycle according to the power preference information. Accordingly, by defining the changes that may occur because of the variation of the power parameters as loss information and gain information, the terminal may calculate the relative values or absolute values of the loss information and gain information.

The gain information that may be obtained at operation S470 is as follows.

Delay time reduction (sec, msec): If it is possible to negate delay time in using a network, the user may enjoy various types of internet services such as web surfing without latency. For example, if the long DRX timer is made long enough in LTE, the mode transition from the RRC CONNECTED MODE to THE RRC IDLE MODE is negated so as to receive new data appearing in a duration that is shorter than the length of the long DRX timer without latency, resulting in reduction of the delay time.

Power consumption (mW, mA) reduction: If the long DRX timer, UIT, onDurationTimer, or DRX inactivity timer is set to a short time, it is possible to obtain a large power efficiency gain. For example, assuming that the power consumption per certain unit time in each RRC state is quantized, it is possible to know the RRC state change approximately by combining the network usage information and the power parameter set information. If the RRC state at a certain time and power consumption amount in the RRC state per unit time are known, it is possible to obtain the total power consumption amount. By comparing the power consumption with the old parameter set and the power consumption with another parameter set, it is possible to calculate the power consumption gain obtained with the changed power parameter set.

Throughput (Mbps) enhancement: If the delay time decreases, it is possible to attempt data communication more quickly. Thus, the probability of securing resource occupancy priority increases in competition with other terminals. Since throughput is important for the services requiring seamless data communication such as video streaming services, it can be used as one item of the gain information. In case of the service of providing videos through a video server, which is characterized in that data are received in a burst fashion and the communication is suspended when a cache is filled with the video data, if the UIT value is not long enough the state transition occurs repeatedly. Thus, the data reception delay may increase gradually.

The loss information that may be obtained at operation S470 is as follows.

Delay time increment (msec, sec): If the terminal stays in the RRC CONNECTED MODE continuously because of the UIT so as to process the data being generated subsequently without latency, it is possible to improve the user's sensible quality. Otherwise, if data are generated after the terminal enters the RRC IDLE MODE upon expiry of the UIT, the mode transition should be made to the RRC CONNECTED MODE and this may cause degradation of the user's sensible quality. Accordingly, it is possible to predict RRC state transition by applying a parameter set to the network usage information collected in a specific duration and check the delay time taken for switching to the corresponding state without receiving the data immediately in the RRC CONNECTED MODE depending on the prediction result.

Power consumption (mW, mA) increment: In case the UIT and DRX inactivity timer are set to long times the service can always be used with the least delay time even though the user uses the network irregularly. This has the advantage of obtaining a high time gain but also has the disadvantage of incurring power loss because the terminal stays in the RRC CONNECTED MODE.

The gain information and loss information can be calculated in various ways. For example, the terminal may calculate power consumption using the network usage amount per certain unit time $D_{total}$ and the power parameter.

As mentioned, the terminal may check the RRC state of the terminal per certain unit time using the power parameter. Accordingly, if the power consumption amounts in the respective RRC states are known, it is possible to calculate the power consumption amount during a certain duration.

In detail, assuming the power consumption amount is $P_{tail}$ in the RRC connected mode, $P_{idle}$ in the RRC idle mode, and $P_{active}$ while receiving data per second, the total power consumption amount to the network usage amount logged in unit of second is calculated as: $P_{total} = T_{tail} P_{tail} + T_{idle} P_{idle} + T_{active} P_{active}$ The power consumption amount is obtained under the assumption that only the UIT varies according to the power preference information. Since the UIT value varies according to the power preference information, the power consumption amount also varies according to the power preference information.

For example, it is assumed that the UIT is set to 5 seconds for the power preference information indicating 0 or set to 15 seconds for the power preference information indicating 1. In this case, if the power preference information indicates 0, state transition to the RRC idle mode is made after 5 seconds. If the power preference information indicates 1, state transition to the RRC idle mode is made after 15 seconds. This means that there is a difference of RRC state for 10 seconds, resulting in a difference in power consumption amount. Accordingly, it is possible to obtain the gain information and loss information for the power parameters corresponding to the respective power preference information values.

After calculating the gain information and loss information, the terminal receives the user preference information at operation S440 and selects the power preference information based on the user preference information at operation S450.

For example, if the user preference information indicates power efficiency increment, the terminal may select the power preference information indicating the least power consumption. If the user preference information indicates sensible quality enhancement, the terminal may select the power preference information indicating channel quality enhancement. The power preference information indicating channel quality enhancement may be to minimize delay time.

Figure 5:
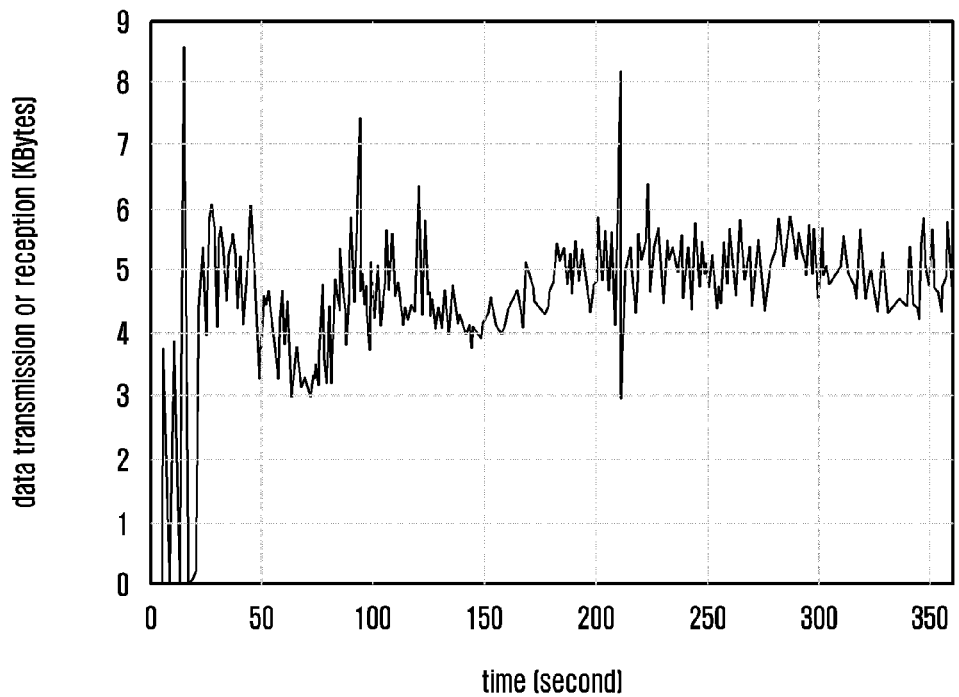
FIG. 5 is a diagram illustrating graphs showing difference of network usage amounts between the cases with or without inclusion of background network usage amount.
Figure 5:
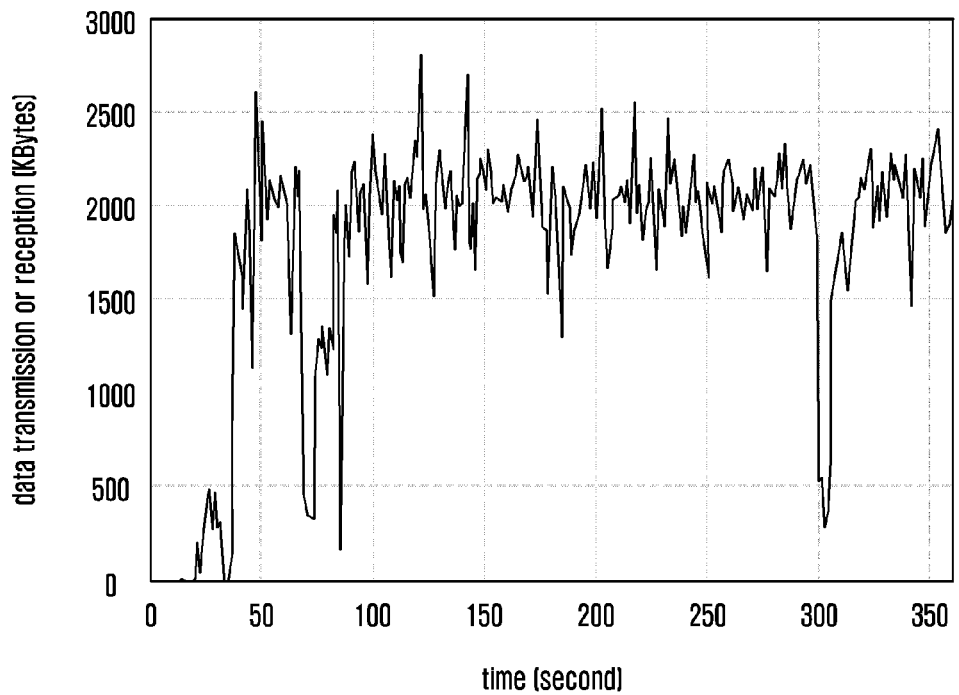

FIG. 5 is a diagram illustrating graphs showing difference of network usage amounts between the cases with and without inclusion of background network usage amount.

Part (a) of FIG. 5 is a graph showing the change in network usage amount of an application service (e.g. VoIP) when the background network usage amount is not included. When the background network usage amount is ignored because it is less than a predetermined threshold, it is possible to consider only the network usage amount generated by the application in use. In this case, if the network usage amount is not large, it is possible to configure the power preference information to indicate the normal mode regardless of the user preference. That is, if the network usage amount is small enough to ignore, it may be preferable to configure the preference information to indicate the normal mode rather than the low power mode in view of power consumption and sensible quality.

Part (b) of FIG. 5 is a graph showing the variation of network usage when the background network usage amount is included. This is the case where the background network usage amount exceeds a predetermined threshold. Thus, the background network usage amount is included, which results in an abrupt increase of the network usage amount. In this case, the power consumption difference may become large depending on the power parameter values. Accordingly, if the user preference indicates the power efficiency enhancement, it is preferable to configure the power preference information to indicate the low power mode.

Figure 6:
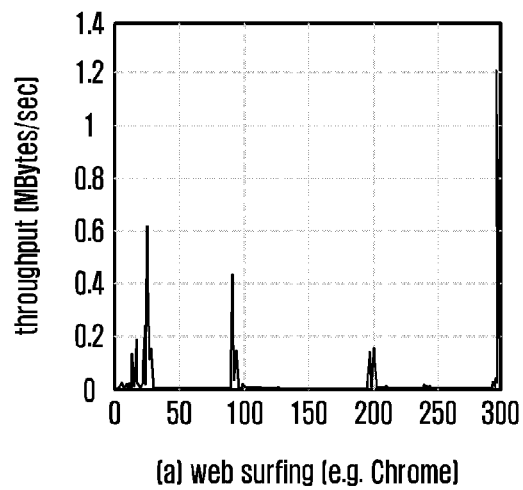
FIG. 6 is a diagram illustrating graphs showing the throughput according to type of application.
Figure 6:
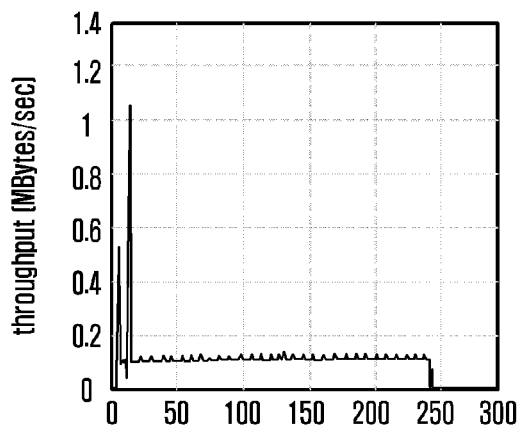

FIG. 6 is a diagram illustrating graphs showing the throughput according to type of application. Part (a) of FIG. 6 is a graph showing the variation of throughput when the user executes a web browser application for web surfing. Part (b) of FIG. 6 is a graph showing the variation of throughput when the user executes a video playback application. The throughput may be included in the application usage information.

In part (a) of FIG. 6, the graph shows that the throughput occurs sporadically while the web browser application is running. In this case, the terminal may configure the power preference information to increase the power efficiency compared with the continuous data transmission/reception.

In part (b) of FIG. 6, the graph shows that the throughput occurs continuously. In this case, the terminal may configure the power preference information to have continuous data transmission/reception for the application having the usage information as shown in part (b) of FIG. 6.

If the background network usage amount is not so large, the terminal may select the power configuration information depending on the type of the application. However, when multiple services are running on the terminal, it is difficult to select any suitable power preference information. Accordingly, even when the background network usage amount is less than the predetermined threshold value, the terminal may select the power preference information based on the network usage information.

Figure 7:
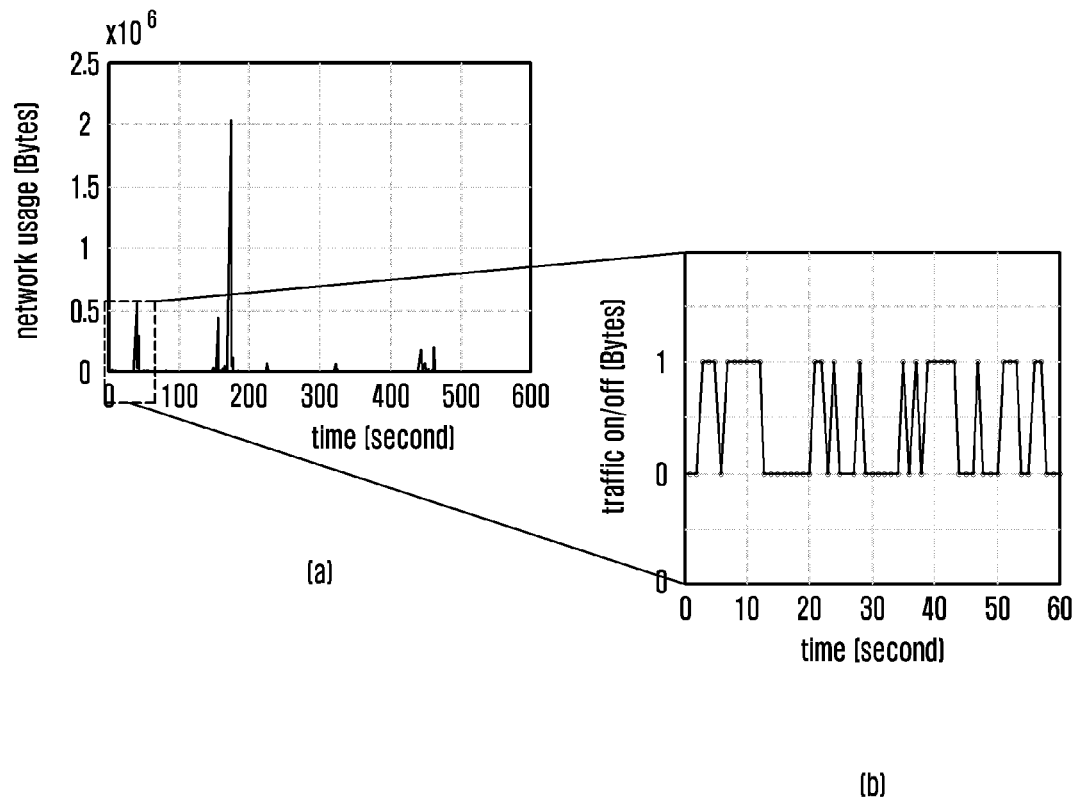
FIG. 7 is a diagram illustrating a graph showing the variation of network usage.

FIG. 7 is a diagram illustrating a graph showing the variation of network usage. Part (a) of FIG. 7 shows the variation of network usage during the time period from 0 to 600 seconds. Part (b) of FIG. 7 shows the variation of network usage during the time period from 0 to 60 seconds, and the vertical axis of the graph is marked with 0 for non-use of the network and 1 for use of the network. The terminal may calculate the gain or loss dependent on the parameter set based on the above information.

Figure 8:
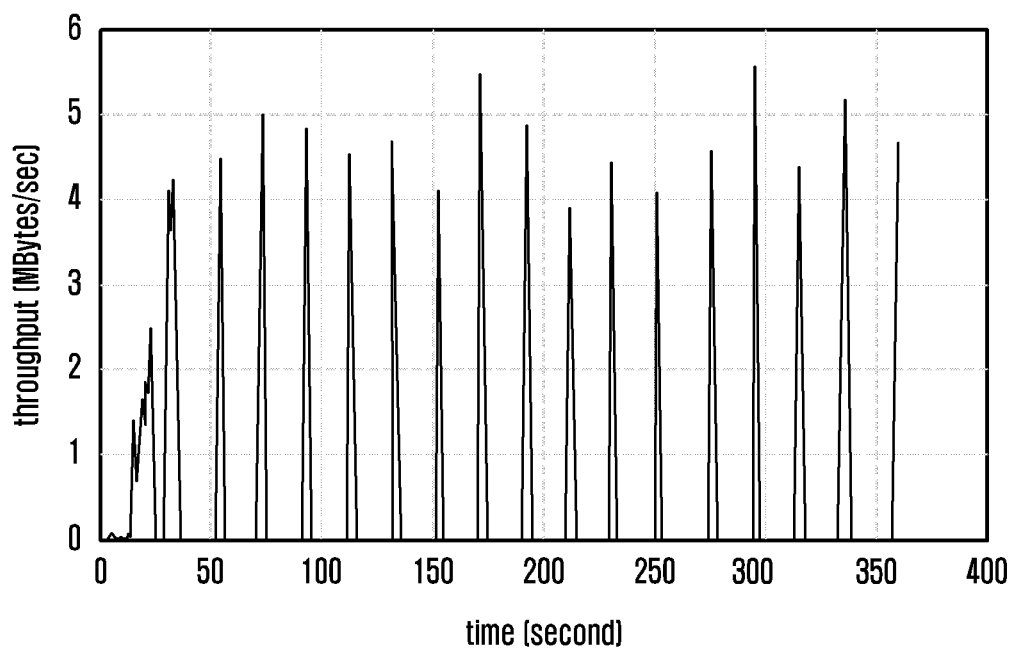
FIG. 8 is a diagram illustrating a graph showing the variation of throughput in accordance with the use of the terminal.

FIG. 8 is a diagram illustrating a graph showing the variation of throughput in accordance with the use of the terminal. FIG. 8 shows the throughput occurring in the case of using a video playback application for watching a video provided by a video server. Referring to FIG. 8, because the video playback application is characterized by receiving data bursts and communication is suspended if a cache is filled with the data, state transition may occur repeatedly if the UIT value is not long enough. Thus, the data reception delay may increase gradually.

Figure 9:
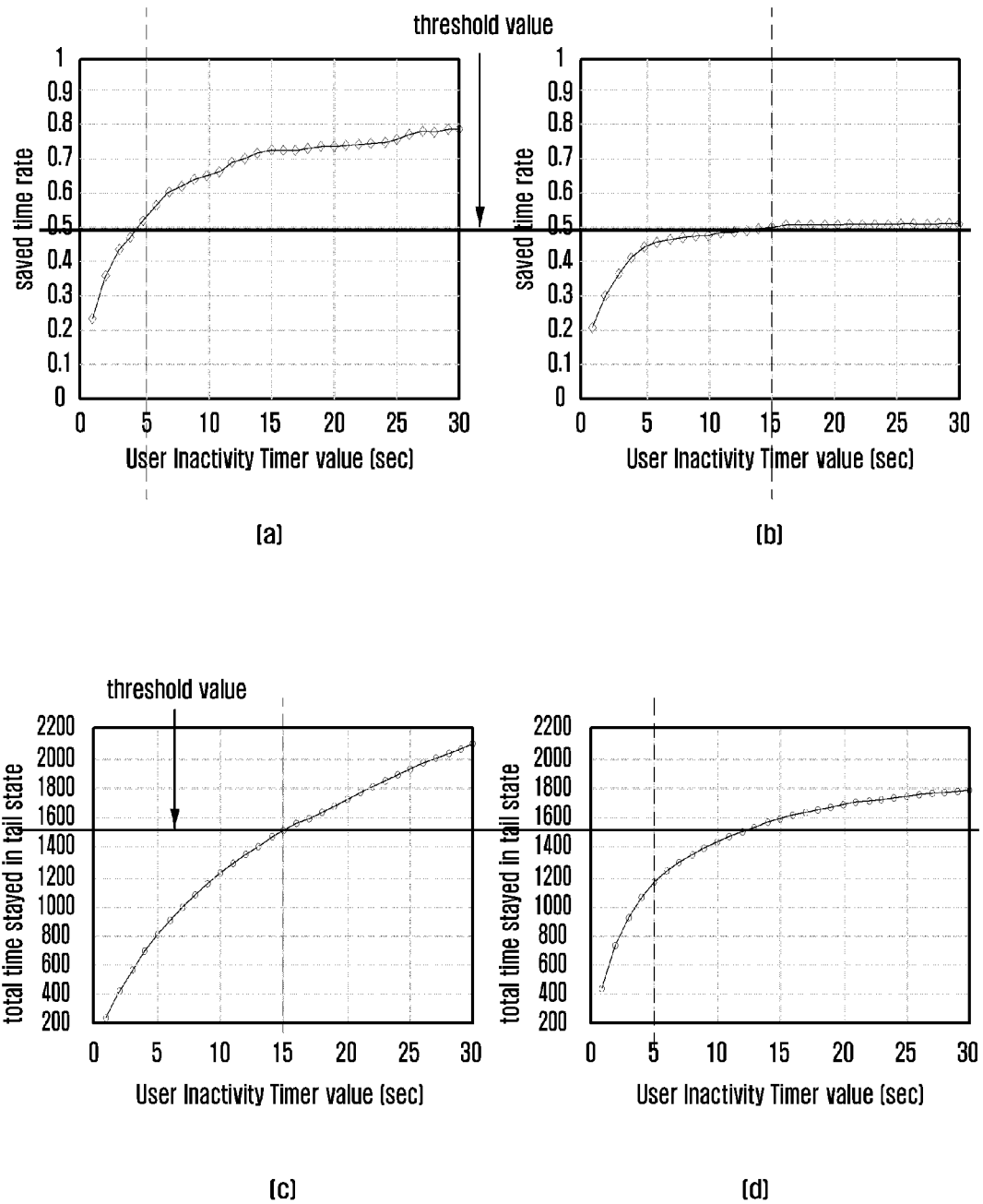
FIG. 9 is a diagram illustrating graphs for use in selecting the power preference information based on the background network usage information and threshold value according to another embodiment of the present disclosure.

FIG. 9 is a diagram illustrating graphs for use in selecting the power preference information based on the background network usage information and threshold value according to another embodiment of the present disclosure. If the DRX period is set to a longer time, the power efficiency may drop sharply even when the user opts to improve the sensible quality. Hereinafter, a description is made of the method of selecting from among the power preference information the power preference information indicating the least power consumption at which sensibility qualities exceed a predetermined sensible quality threshold.

In the drawing, a rate of reducing the overhead occurring in transitioning from the RRC idle mode to the RRC connected mode is referred to as saved time rate. The higher the saved time rate is, the higher the user's sensible quality.

Although the terminal can select the UIT value with the highest saved time rate when the user opts to improve the sensible quality, this may cause excessive power consumption. Accordingly, it may be necessary to configure a sensible quality threshold to select the UIT having the least sensibility among the UITs whose sensible qualities are greater than the threshold. This threshold may be preconfigured or configured at the time when the user's sensible quality does not change even though the saved time rate increases.

Assuming that the UIT is set to 5 seconds for the power preference information set to 0 to indicate low power mode or to 15 seconds for the power preference information set to 1 to indicate normal mode, the terminal may select the power preference information set to 0 because the UIT value where the sensible quality exceeds the threshold in accordance with the network usage amount is 5 seconds as shown in graph (a) of FIG. 9. However, for graph (b) of FIG. 9, the terminal may select the power preference information set to 1 because the UIT value where the sensible quality exceeds the threshold is 15 seconds. Therefore, it can be seen that if the user opts to improve the sensible quality, the power preference information may be 1 or 0 depending on the network usage information.

Graphs (c) and (d) of FIG. 9 are the graphs for the case where the user opts to improve the power efficiency. In order to improve the power efficiency, the terminal may select the UIT having a short UIT value, but this may cause an excessive drop of sensible quality. Thus it may be necessary to configure a power consumption threshold to select a UIT value having the highest power consumption among the UITs with which the power consumption does not exceed the power consumption threshold. Referring to graph (c) of FIG. 9, the terminal may set the power preference information to 1 because the UIT with which the power consumption does not exceed the threshold is 15 seconds. Referring to graph (d) of FIG. 9, the terminal may set the power preference information to 0 because the UIT with which the power consumption does not exceed the threshold is less than 15 seconds.

That is, when the user opts to improve the power efficiency, the power preference information is not always set to 0 and may be set to 1 depending on the network usage information.

Figure 10:
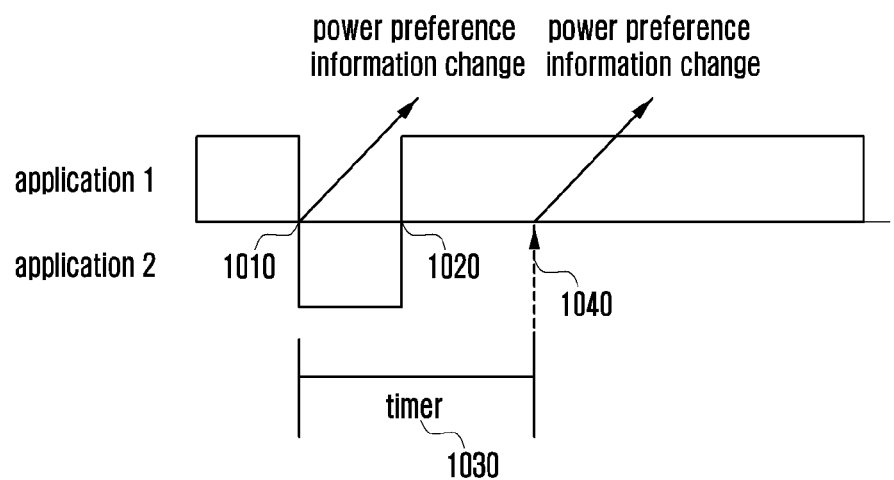
FIG. 10 is a diagram for explaining a signaling overhead reduction method according to another embodiment of the present disclosure.
Figure 10:
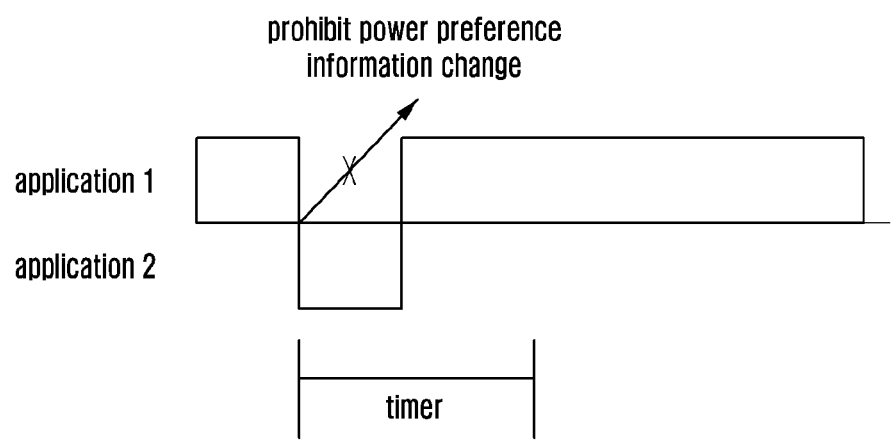

FIG. 10 is a diagram for explaining a signaling overhead reduction method according to another embodiment of the present disclosure. A terminal transmitting power preference information to the base station too frequently may cause too much signaling overhead. In order to avoid this, the conventional method does not allow for change to the power preference information again until a predetermined time period has elapsed since the previous change of the power preference information as shown in part (a) of FIG. 10.

Suppose that only the type of application is considered because the background network usage amount is small. In part (a) of FIG. 10, if application 2 characterized by high power consumption is activated at the time point 1010 while application 1 characterized by low power consumption is running, the power preference information indicative of the normal mode may be changed to the power preference information indicative of the low power mode. At this time, a timer 1030 starts, and the power preference information cannot be changed until the timer 1030 expires at time 1040 although application 1 is activated again at time 1020.

In order to solve the above problem, the present disclosure proposes an intelligent mechanism for preventing the power preference information from being changed when the running duration of an application is shorter than a threshold value. The intelligent mechanism determines whether to change the power preference information taking into account the running duration of the application.

Referring to part (b) of FIG. 10, it is shown that application 2 is running for a duration much shorter than that of the timer. Since application 2 is running for a very short duration, the power consumption and sensible quality are not impacted while application 2 is running. If the power preference information is not changed when application 1 is activated again, this may cause a problem in association with power consumption and sensible quality. The present disclosure is capable of reducing signaling overhead by preventing the power preference information from being changed in a situation where the running duration of the application is shorter than a predetermined threshold.

Assuming an exemplary situation where messages are posted irregularly in a group chatting site while the user is surfing the web, it is possible to reduce signaling overhead and improve efficiency by protecting against the change of power preference information due to the messages.

As described above, the power preference information selection method and apparatus of the present disclosure is advantageous in terms of improving the power efficiency of a terminal by providing a base station with the power preference information based on the background network usage information and of minimizing signaling overhead in communication with the base station by introducing an intelligent mechanism of protecting against excessive signaling based on the application running time.

Although various embodiments have been described using specific terms, the specification and drawings are to be regarded in an illustrative rather than a restrictive sense in order to help understand the present disclosure. It is obvious to those skilled in the art that various modifications and changes can be made thereto without departing from the broader spirit and scope described in this disclosure.

What is claimed is:

1. A terminal for selecting power preference information, the terminal comprising:
   a transceiver; and
   a controller configured to:
      identify a background network usage amount of the terminal, the background network usage amount being associated with background services running in the terminal without interaction with a user;
      determine whether the background network usage amount is equal to or greater than a first threshold;

determine, when the background network usage amount is equal to or greater than the first threshold, power preference information based on the background network usage amount and application usage information, the power preference information being used to determine a discontinuous reception (DRX) parameter; and transmit the power preference information to a base station, wherein to determine the power preference information the controller is further configured to:

calculate loss information and gain information;

receive user preference information from the user; and select the power preference information based on the loss information, the gain information, and the user preference information.

2. The terminal of claim 1, wherein the controller is configured to determine the power preference information having the gain information greater than a second threshold and the loss information.

3. The terminal of claim 1, wherein the gain information includes at least one of delay time reduction, power consumption reduction, and throughput enhancement, and the loss information includes at least one of delay time increment and power consumption increment.

4. The terminal of claim 1, wherein the gain information and the loss information are associated with a power parameter set including at least one of a DRX cycle, a DRX timer, a user inactivity timer (UIT), an onDuration timer, a DRX inactivity timer, and a DRX retransmission timer.

5. The terminal of claim 1, wherein the controller is configured to determine whether to transmit the power preference information when an application is executed and a running duration of the application is shorter than a predetermined time.

6. The terminal of claim 1, wherein the controller is configured to:

acquire the application usage information for an executed application; and determine the power preference information based on the application usage information and user preference information when the background network usage amount is equal to or less than the first threshold.

7. The terminal of claim 1, wherein the controller is configured to determine the power preference information based on the background network usage amount when the background network usage amount is equal to or less than the first threshold and a number of applications executed is equal to or greater than a predetermined number.

8. The terminal of claim 1, wherein the power preference information includes a power preference indicator (PPI).

9. A method for selecting power preference information by a terminal, the method comprising:

identifying background network usage amount of the terminal, the background network usage amount being associated with background services running in the terminal without interaction with a user;

determining whether the background network usage amount is equal to or greater than a first threshold;

determining, when the background network usage amount is equal to or greater than the first threshold, power preference information based on the background network usage amount and application usage information, the power preference information being used to determine a discontinuous reception (DRX) parameter, wherein determining the power preference information comprises:

calculating loss information and gain information;

receiving user preference information from the user; and selecting the power preference information based on the loss information, the gain information, and the user preference information; and transmitting the power preference information to a base station.

10. The method of claim 9, wherein determining the power preference information comprises determining the power preference information having the gain information greater than a second threshold and the loss information.

11. The method of claim 9, wherein the gain information includes at least one of delay time reduction, power consumption reduction, and throughput enhancement, and the loss information includes at least one of delay time increment and power consumption increment.

12. The method of claim 9, wherein the gain information and the loss information are associated with a power parameter set including at least one of a DRX cycle, a DRX timer, a user inactivity timer (UIT), an onDuration timer, a DRX inactivity timer, and a DRX retransmission timer.

13. The method of claim 9, further comprising determining whether to transmit the power preference information when an application is executed and a running duration of the application is shorter than a predetermined time.

14. The method of claim 9, further comprising:

acquiring the application usage information for an executed application; and determining the power preference information based on the application usage information and user preference information when the background network usage amount is equal to or less than the first threshold.

15. The method of claim 9, further comprising:

determining, when the background network usage amount is equal to or less than the first threshold and a number of applications executed is equal to or greater than a predetermined number, the power preference information based on the background network usage amount.

16. The method of claim 9, wherein the power preference information includes a power preference indicator (PPI).

* * * * *